US012422099B1

(12) United States Patent
Witman et al.

(10) Patent No.: US 12,422,099 B1
(45) Date of Patent: Sep. 23, 2025

(54) HYDROGEN COMPRESSION AND STORAGE SYSTEMS

(71) Applicant: National Technology & Engineering Solutions of Sandia, LLC, Albuquerque, NM (US)

(72) Inventors: Matthew D. Witman, Oakland, CA (US); Vitalie Stavila, Oakland, CA (US)

(73) Assignee: National Technology & Engineering Solutions of Sandia, LLC., Albuquerque, NM (US)

( * ) Notice: Subject to any disclaimer, the term of this patent is extended or adjusted under 35 U.S.C. 154(b) by 305 days.

(21) Appl. No.: 17/967,459

(22) Filed: Oct. 17, 2022

(51) Int. Cl.
*F17C 5/06* (2006.01)
*F17C 11/00* (2006.01)
*F17C 13/04* (2006.01)

(52) U.S. Cl.
CPC .............. *F17C 5/06* (2013.01); *F17C 11/005* (2013.01); *F17C 13/04* (2013.01); *F17C 2221/012* (2013.01); *F17C 2227/0157* (2013.01); *F17C 2227/0171* (2013.01); *F17C 2227/0302* (2013.01); *F17C 2250/032* (2013.01); *F17C 2250/043* (2013.01); *F17C 2250/0447* (2013.01); *F17C 2250/0642* (2013.01); *F17C 2270/01* (2013.01)

(58) Field of Classification Search
CPC .......... F17C 5/06; F17C 11/005; F17C 13/04; F17C 2221/012; F17C 2227/0157; F17C 2227/0302; F17C 2227/0171; F17C 2250/032; F17C 2250/043; F17C 2250/0447; F17C 2250/0642; F17C 2270/01
USPC .............................................................. 141/4
See application file for complete search history.

(56) References Cited

U.S. PATENT DOCUMENTS

| | | | | | |
|---|---|---|---|---|---|
| 4,085,590 | A * | 4/1978 | Powell | F01K 25/00 | 60/671 |
| 4,111,689 | A * | 9/1978 | Liu | C01B 3/0031 | 420/580 |
| 4,278,466 | A * | 7/1981 | de Pous | C01B 3/0031 | 423/644 |
| 4,402,187 | A * | 9/1983 | Golben | F04B 37/02 | 423/248 |
| 4,446,101 | A * | 5/1984 | Bernauer | C01B 3/0031 | 420/583 |
| 4,505,120 | A * | 3/1985 | Golben | F04B 19/24 | 123/553 |

(Continued)

FOREIGN PATENT DOCUMENTS

WO WO-2023223347 A1 * 11/2023 ............. G16C 60/00

*Primary Examiner* — Kenneth Rinehart
*Assistant Examiner* — Stephanie A Shrieves
(74) *Attorney, Agent, or Firm* — Eschweiler & Potashnik LLC; Samantha Updegraff

(57) ABSTRACT

A hydrogen compressor includes an inlet valve, an outlet valve, a storage container in fluid communication with the inlet valve and the outlet valve, a heat transfer device, and storage media arranged inside the storage container. The storage media is made from an initial composition that includes a first element and a second element. The second element has at least one substitution element that is identified based on at least one of the ground state volume per atom of the elemental solid, the covalent radius, the Pauling electronegativity, and the number of valence electrons of the substitution element.

20 Claims, 4 Drawing Sheets

(56) References Cited

U.S. PATENT DOCUMENTS

| | | | | |
|---|---|---|---|---|
| 4,832,913 | A * | 5/1989 | Hong .................... | C01B 3/0078 423/644 |
| 7,093,626 | B2 * | 8/2006 | Li ......................... | F17C 11/005 141/231 |
| 9,028,781 | B2 | 5/2015 | Naito et al. | |
| 10,396,388 | B2 | 8/2019 | Bosmann et al. | |
| 12,228,247 | B2 * | 2/2025 | Gallandat ......... | H01M 8/04201 |
| 2002/0029820 | A1 * | 3/2002 | Ovshinsky .............. | C22C 23/02 141/110 |
| 2004/0204503 | A1 | 10/2004 | Beyer | |
| 2006/0029529 | A1 * | 2/2006 | Pinkerton ......... | H01M 8/04089 429/444 |
| 2019/0252707 | A1 * | 8/2019 | Bahar ................... | H01M 8/065 |
| 2020/0332783 | A1 * | 10/2020 | Chaise .................... | F04B 37/12 |
| 2021/0293381 | A1 * | 9/2021 | Vinod Muthachikavil .................. | F17C 11/005 |
| 2022/0205592 | A1 * | 6/2022 | Gallandat ............. | F17C 13/026 |
| 2024/0263747 | A1 * | 8/2024 | Schmied ............... | F17C 11/005 |

* cited by examiner

HYDROGEN COMPRESSION AND STORAGE SYSTEMS

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

TECHNICAL FIELD

Features described herein relate generally to hydrogen compression and storage systems, and more particularly relate to systems, mechanisms, and methods of substituting materials used in hydrogen compression and storage systems to improve the performance of the hydrogen compression or storage system.

BACKGROUND

Hydrogen fuel cells are increasingly used to power, for example, cars, trucks, and other vehicles. Hydrogen stored in fuel cell powered vehicles is stored at an increased pressure to provide sufficient energy in a small enough volume to power the vehicle. Hydrogen tanks can be refilled from high volume storage tanks located at hydrogen filling stations. The filling station tanks store hydrogen at pressures suitable for filling vehicles, such as, for example, about 350 bar to about 850 bar. The small size of the molecules of gaseous hydrogen makes pressurizing and storing hydrogen more difficult than fuels that can be stored in a liquid state, such as, for example, gasoline or diesel fuel. Thus, specialized mechanical compressors can be used to pressurize the hydrogen gas to the desired filling pressure of about 350 bar to about 850 bar.

Conventional mechanical compressors used to pressurize hydrogen gas may be associated with leaks through the various dynamic seals required by a mechanical pump, can generate significant vibration during operation, and are inefficient in view of the quantity of energy required to run the compressor. An improvement over conventional mechanical compressors is a solid-state compressor that stores hydrogen atoms in solid storage media formed from a metal alloy. These metal alloys interact with gaseous hydrogen to form metal hydrides that capture hydrogen atoms in the atomic lattice of the metal alloy. The hydrogen-charged storage media can be heated to release the hydrogen atoms as gaseous hydrogen. As heat is applied to bring the storage media to a desired temperature, hydrogen is released and reaches a plateau pressure at that temperature. The plateau pressure at a particular temperature is different for storage media made from different materials.

SUMMARY

The following is a brief summary of subject matter that is described in greater detail herein. This summary is not intended to be limiting as to the scope of the claims.

In view of the foregoing, improved hydrogen compressors are needed that included metal alloy compositions determined via systems, mechanisms, and methods that facilitate the substitution of elements in alloys used for hydrogen compression and storage systems. Described herein is a hydrogen compressor that includes a storage media formed of a metal alloy, where the metal alloy has a composition.

Also described herein is a method of manufacturing a hydrogen compressor and a method of using the hydrogen compressor. With more particularity, a method for identifying the composition of the storage media of the hydrogen compressors referenced above is described herein. A designer of a hydrogen compressor can identify a proposed composition for the storage media of the hydrogen compressor. There are several known metal alloys that are employed in connection with storing hydrogen, and the designer can identify one of such metal alloys allows. The proposed composition has a known plateau pressure at a given temperature. Further, the proposed composition includes a first element and a second element (and optionally other elements).

A computing system that executes a machine learning model receives the proposed composition and a target plateau pressure (at the given temperature). For instance, the computing system receives an indication that the (final) composition for the storage media of the hydrogen compressor is to have a higher plateau pressure than the plateau pressure of the proposed composition. In another example, the computing system receives an indication that the (final) composition for the storage media of the hydrogen processor is to have a lower plateau pressure than the plateau pressure of the proposed composition.

The machine learning model identifies an updated composition based upon properties of the elements of the proposed composition and further based upon the received target plateau pressure. The updated composition includes at least one of the first element and the second element of the proposed composition, and further includes a third element. Therefore, for example, when the proposed composition is AB, the updated composition can be ABC (such that BC in the updated composition is a substitute for B in the proposed composition). With more particularity, the machine learning model identifies the updated composition based upon properties of the elements in the proposed composition and the elements in the substitute composition. Example properties of the elements include but are not limited to including: 1) the ground state volume per atom of each of the elements in solid form; 2) covalent radii of atoms of the elements; 3) the Pauling electronegativity of the elements; and 4) and the number of valence electrons of atoms of the elements.

With still more detail, when the plateau pressure of the (final) composition is to be greater than the plateau pressure of the proposed composition, the final composition can be identified based upon: 1) the average ground state volume per atom of the final composition being less than the average ground state volume per atom of the proposed composition; 2) the average covalent radii of elements of the final composition being less than the average covalent radii of elements of the proposed composition; 3) the average number of valence electrons of elements of the final composition being less than the average number of valence electrons of the proposed composition; and/or 4) the average Pauling negativity of elements of the final composition being greater than the average Pauling negativity of the elements of the proposed composition. Utilizing such process, an improved hydrogen compressor can be manufactured and used. It is to be emphasized, however, that the machine learning model can identify an updated composition where the target plateau pressure is lower than that associated with the proposed composition, in which case the updated (final) composition can be identified based upon: 1) the average ground state volume per atom of the final composition being greater than the average ground state volume per atom of the proposed composition; 2) the average covalent radii of elements of the final composition being greater than the average covalent radii of elements of the proposed composition; 3) the average number of valence electrons of elements of the final composition being greater than the average number of valence electrons of the proposed composition; and/or 4) the average Pauling negativity of elements of the final composition being less than the average Pauling negativity of the elements of the proposed composition.

The above summary presents a simplified summary in order to provide a basic understanding of some aspects of the devices, systems, and/or methods discussed herein. This summary is not an extensive overview of the devices, systems, and/or methods discussed herein. It is not intended to identify key/critical elements or to delineate the scope of such devices, systems, and/or methods. Its sole purpose is to present some concepts in a simplified form as a prelude to the more detailed description that is presented later.

DETAILED DESCRIPTION

Figure 1:
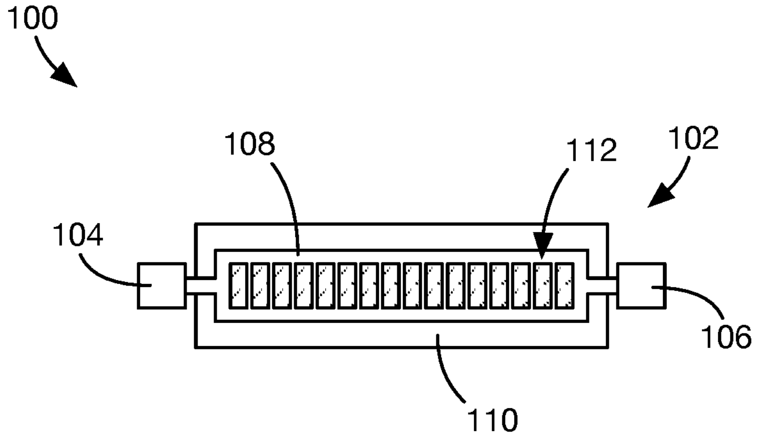
FIG. 1 is a schematic view of a hydrogen compressor.

Various technologies pertaining to hydrogen compressors and storage systems are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As described herein, when one or more components are described as being connected, joined, affixed, coupled, attached, or otherwise interconnected, such interconnection may be direct as between the components or may be indirect such as through the use of one or more intermediary components. Also as described herein, reference to a "member," "component," or "portion" shall not be limited to a single structural member, component, or element but can include an assembly of components, members, or elements. Also as described herein, the terms "substantially" and "about" are defined as at least close to (and includes) a given value or state (preferably within 10% of, more preferably within 1% of, and most preferably within 0.1% of).

"Computer" or "processor" as used herein includes, but is not limited to, any programmed or programmable electronic device or coordinated devices that can store, retrieve, and process data and may be a processing unit or in a distributed processing configuration. Examples of processors include microprocessors, microcontrollers, graphics processing units (GPUs), floating point units (FPUs), reduced instruction set computing (RISC) processors, digital signal processors (DSPs), field programmable gate arrays (FPGAs), etc. The processor can also be a processor dedicated to the training of neural networks and other artificial intelligence (AI) systems.

"Logic," synonymous with "circuit" as used herein includes, but is not limited to, hardware, firmware, software and/or combinations of each to perform one or more functions or actions. For example, based on a desired application or needs, logic may include a software-controlled processor, discrete logic such as an application specific integrated circuit (ASIC), programmed logic device, or other processor. Logic may also be fully embodied as software. "Software," as used herein, includes but is not limited to one or more computer readable and/or executable instructions that cause a processor or other electronic device to perform functions, actions, processes, and/or behave in a desired manner. The instructions may be embodied in various forms such as routines, algorithms, modules, or programs including separate applications or code from dynamically linked libraries (DLLs). Software may also be implemented in various forms such as a stand-alone program, a web-based program, a function call, a subroutine, a servlet, an application, an app, an applet (e.g., a Java applet), a plug-in, instructions stored in a memory, part of an operating system, or other type of executable instructions or interpreted instructions from which executable instructions are created.

As used herein, "data storage device" means a device or devices for non-transitory storage of code or data, e.g., a device with a non-transitory computer readable medium. As used herein, "non-transitory computer readable medium" means any suitable non-transitory computer readable medium for storing code or data, such as a magnetic medium, e.g., fixed disks in external hard drives, fixed disks in internal hard drives, and flexible disks; an optical medium, e.g., CD disk, DVD disk, and other media, e.g., ROM, PROM, EPROM, EEPROM, flash PROM, external flash memory drives, etc.

Hydrogen diffused into the interstitial spaces of a metal lattice to form a metal hydride has a lower entropy than the metal and hydrogen in a gaseous phase. Consequently, the hydride formation is exothermic for any metal lattice that could be used for hydrogen compression, and the storage media can require cooling during hydride formation and discharging hydrogen from the metal hydride requires heating of the storage media. The energy required to release the hydrogen and the pressure at which the hydrogen is released varies according to the properties of the alloy used to form the storage media. Storing hydrogen in a metal alloy at a first pressure by forming metal hydrides and then releasing the hydrogen at a second pressure that is higher than the first pressure enables the function of a solid-state hydrogen compressor that requires very few moving parts relative to conventional gas compressor designs using, for example, a reciprocating piston. For example, a solid-state compressor is configured to capture hydrogen at atmospheric pressure and release the hydrogen at a higher pressure. The hydrogen compressor can be designed to produce hydrogen at various output pressures by using different materials for the storage media and/or by arranging multiple compressions together in series. That is, the output of a first stage can be directed to the input of a second stage that stores hydrogen at the output pressure of the first stage and releases hydrogen at a higher second stage output pressure. Additional stages can be added until the desired output pressure is reached, such as, for example, about 850 bar for a hydrogen filling station.

The particular metal alloys used for the storage media of a solid-state hydrogen compressor depend on the input pressure and temperature and the desired output pressure and temperature. The metal alloy used for storage media can include hydride forming elements A and non-hydride forming elements B in various compositions, such as, for example, $A_2B$, AB, $AB_2$, $AB_3$, and $AB_5$. Other compositions, such as high-entropy alloys (HEAs) including five or more elements can also be used. Altering the performance characteristics of a compressor or compressor stage can be done by altering the composition of the metal alloy from which the storage media is formed, for example, by substituting one element with one or more elements in the same or different proportion to the remainder of the alloy. Rather than a trial-and-error process of altering the alloy composition of the storage media, systems and methods described herein provide substitute materials and amounts of those materials based on an initial alloy composition, the physical properties of the substitute materials, and the desired plateau pressure. Thus, the hydrogen compressors and compressor stages described herein can be tuned to output gaseous hydrogen at a desired pressure and temperature via alteration of the composition of the storage media.

Referring now to FIG. 1, a schematic view of a hydrogen compressor 100 having a single or first compression stage 102 is shown. The compressor 100 includes an inlet valve 104, an outlet valve 106, a storage container 108, and a heat transfer device 110. The storage container 108 contains storage media 112. The storage container 108 can be formed in a cylindrical shape or any other suitable shape for containing pressurized gaseous hydrogen and can be made from any suitable metal or composite material. The storage media 112 is arranged inside the storage container 108 and can formed as separate inserts, pellets, granules, or the like that are removable from or can be integrally formed with the storage container 108.

Figure 2:
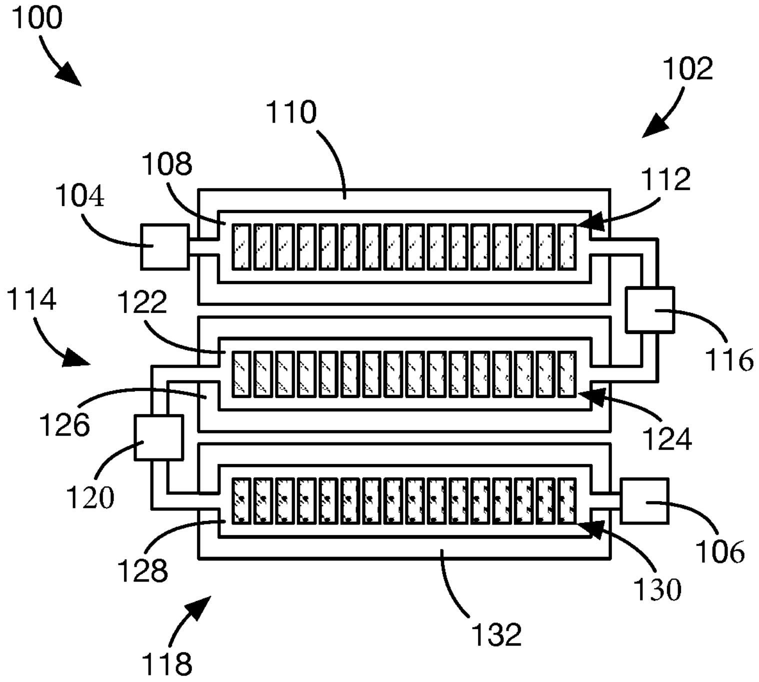
FIG. 2 is a schematic view of a multi-stage hydrogen compressor.

Referring now to FIG. 2, a schematic view of the hydrogen compressor 100 having multiple stages is shown. The first compression stage 102 is connected to a second stage 114 via a second stage inlet valve 116, and the second stage 114 is connected to a third stage 118 via a third stage inlet valve 120. The first compression stage 102 includes an inlet valve 104, the storage container 108 filled with storage media 112 and the heat transfer device 110. The second compression stage 114 includes a second storage container 122 filled with a second storage media 124 and a second heat transfer device 126. The third compression stage 118 includes a third storage container 128 filled with a third storage media 130, a third heat transfer device 132, and an outlet valve 106. In other words, the first, second, and third compression stages 102, 114, 118 are arranged in series so the outlet of one stage is in fluid communication with the inlet of the next stage.

Figure 3:
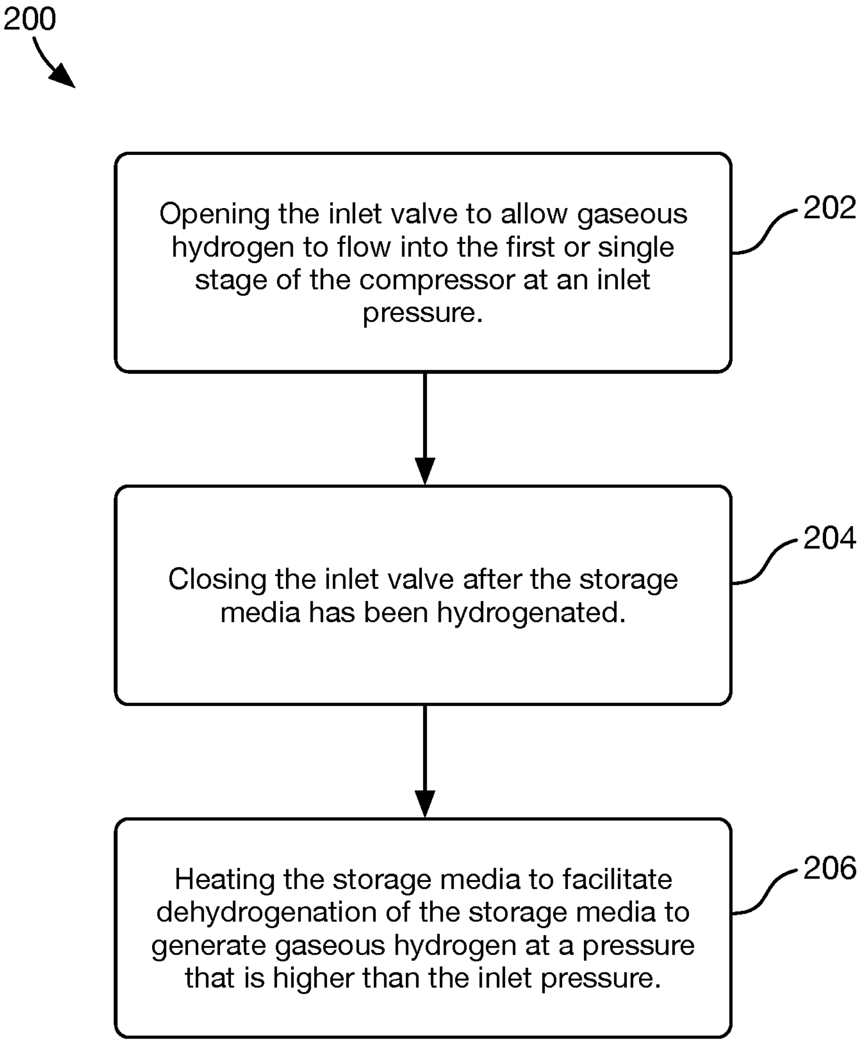
FIG. 3 is a flow diagram showing an exemplary method of operating the hydrogen compressors of FIGS. 1 and 2.

Referring now to FIG. 3, a diagram illustrating a method of operating 200 a hydrogen compressor, such as the hydrogen compressor 100 described herein, is shown. In step 202, the inlet valve 104 is opened to allow gaseous hydrogen to flow into the first or single stage 102 of the compressor 100 at an inlet pressure. The inlet valve 104 remains open while the storage media 112 is charged with hydrogen and is closed in step 204 when the hydrogenation of the storage media 112 of the first or single stage 102 of the compressor 100 is completed. During the charging or hydrogenation of the storage media 112, the heat transfer device 110 can be operated to remove heat from the storage container 108 generated by the hydrogenation of the storage media 112. In a multi-stage compressor, such as the compressor 100 shown in FIG. 2, the heat removed from the first stage 102 can be used, for example, to contribute to the heat needed to release hydrogen from the storage media 124, 126 in the second or third stages 114, 118. In step 206, the storage media 112, 124, 126 is heated to a dehydrogenation temperature to release stored hydrogen. The pressure of the released hydrogen in the first, second, and third stages 102, 114, 118 depends on the composition of the storage media 112, 124, 126 and the temperature to which the storage media 112, 124, 126 is heated during dehydrogenation. Once the hydrogen has been released from the storage media of the final stage in the compressor 100—i.e., the single stage 102 of the compressor 100 of FIG. 1 or the third stage 118 of the compressor 100 of FIG. 2—the outlet valve 106 can be opened to release gaseous hydrogen that is pressurized to the plateau pressure of the final stage of the compressor 100.

The properties of the metal hydride material of the storage media can be tuned to achieve a desired output plateau pressure, such as, for example, an output pressure of about 850 bar required in a hydrogen filling station. Tuning the properties of the metal hydride is done by substituting one or more metals in AB, $AB_2$, $AB_5$, or HEA hydrides to increase the hydrogen plateau or equilibrium pressure. The plateau pressure can be increased by decreasing the hydride desorption enthalpy while increasing the hydride desorption entropy which is challenging because these properties tend to be positively correlated. Conversely, the plateau pressure can be decreased by increasing the hydride desorption enthalply while decreasing the hydride desorption entropy. Predicting the plateau pressure of a particular metal hydride composition can be done by a machine-learning based model that is trained from known compositions to predict the plateau pressure of a metal hydride.

The predictions of the plateau pressure generated by the model and machine-learning techniques do not reveal how much each of a wide variety of properties of the elements of the composition contribute to the plateau pressure. Techniques, such as Shapley Additive Predictions (SHAP) are used to determine the non-linear relationships between the plateau pressure and features like the atomic fraction-weighted mean of a composition's elements' (1) ground state volume per atom of the elemental solid, $\bar{v}_{pa}$; (2) covalent radius, $\bar{r}_c$; (3) Pauling electronegativity, $\bar{\chi}_P$; and (4) number of valence electrons, $\bar{n}_v$. In particular, Applicants have determined that the plateau pressure of a metal hydride composition can be increased by substituting or adding one or more metals to a base composition that decrease $\bar{v}_{pa}$, decrease $\bar{r}_c$, decrease $\bar{n}_v$, and/or increase $\bar{\chi}_P$ relative to the original composition. Similarly, Applicants have determined that the plateau pressure of a metal hydride composition can be decreased by substituting or adding one or more metals to a base composition that increase $\bar{v}_{pa}$, increase $\bar{r}_c$, increase $\bar{n}_v$, and/or decrease $\bar{\chi}_P$ relative to the original composition.

Figure 4:
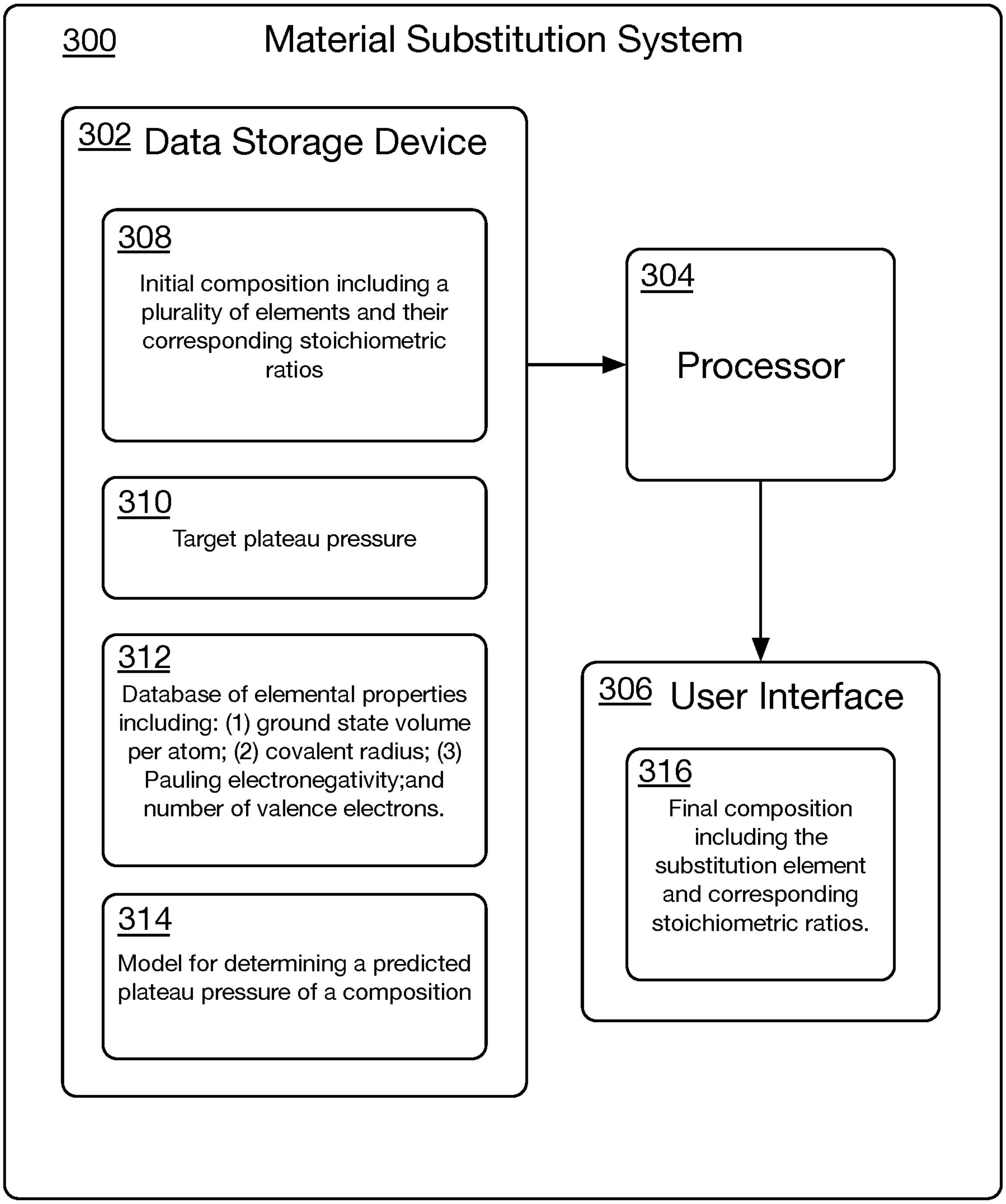
FIG. 4 is a schematic view of a system for determining substitute materials for use in the hydrogen compressors of FIGS. 1 and 2.

Referring now to FIG. 4, a block diagram of a computer-based material substitution system 300 is shown for determining substitutions for elements of a metal alloy used in storage media for storing gaseous hydrogen in a hydrogen compressor or storage system, such as the compressor 100 described herein. The material substitution system 300 includes: one or more data storage devices 302, a processor 304, and a user interface 306. The data storage devices 302 include one or more computer memory chips for storing data corresponding to an initial composition 308 of a metal hydride alloy, a target plateau pressure 310, and elemental properties 312 of elements that are candidates for substitution into the initial composition 308. The structure, various functions, and parameters of one or more predictive models 314 can also be stored by the data storage devices 302. The processor 304 accesses the data stored on the data storage devices 302 and executes operating software to determine a final composition 316 that is presented to the user via the user interface 306. The predictive model 314 can be a tree-based machine learning model, such as, for example, a gradient boosting tree that is trained to predict the hydrogen desorption enthalpy and entropy in a metal hydride from which a plateau pressure ($P_{eq}$) can be calculated, $$P_{eq} = \exp\left[-\frac{\Delta H}{RT} + \frac{\Delta S}{R}\right].$$

Figure 5:
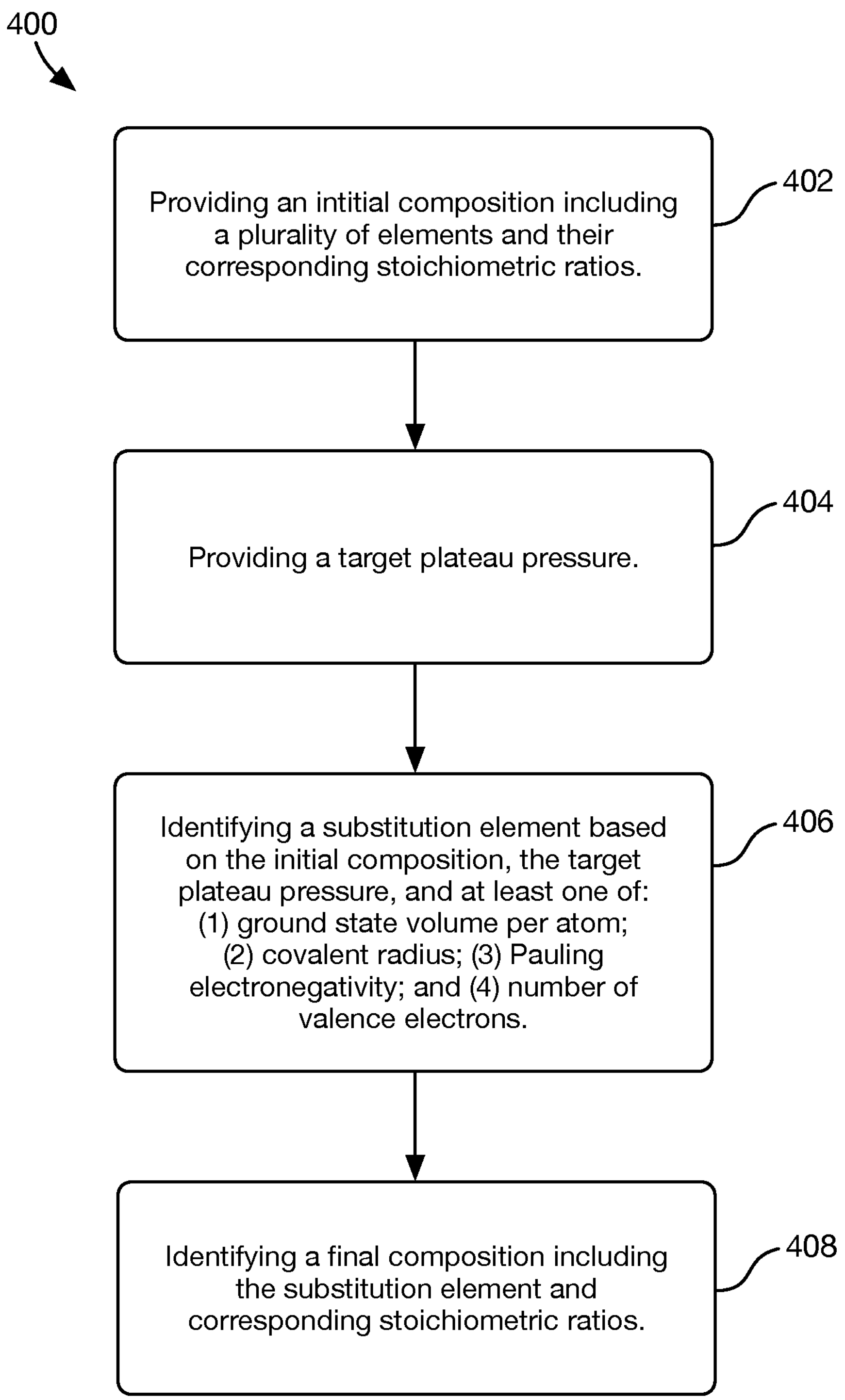
FIG. 5 is a flow diagram showing an exemplary method of operating the system of FIG. 4.

Referring now to FIG. 5, a diagram illustrating a method of operating 400 a material substitution system, such as the substitution system 300 described herein, is shown. The material substitution system 300 is provided with an initial composition of a metal hydride alloy in step 402 and a target plateau pressure in step 404. In step 406, a substitution element is identified based on the initial composition, the target plateau pressure, and at least one of (1) ground state volume per atom of the elemental solid, $\bar{v}_{pa}$; (2) covalent radius, $\bar{r}_c$; (3) Pauling electronegativity, $\bar{\chi}_P$; and (4) number of valence electrons, $\bar{n}_v$. A final composition is then identified in step 408 that includes the substitute element and the relative stoichiometric ratios of the substitute element to the other elements of the final composition.

Examples of substitutions from initial compositions are shown in Table 1, included below. Applicants have determined that the plateau pressure of a metal hydride composition can be increased by substituting or adding one or more metals to a base composition that decrease $\bar{v}_{pa}$, decrease $\bar{r}_c$, decrease $\bar{n}_v$, or increase $\chi_P$ relative to the original composition, as is shown by the data of Table 1.

TABLE 1

Example final compositions resulting from substituting A and/or B sites of a selected initial composition (AB, $AB_2$, HEA) that result in an increased in plateau pressure of a final composition.

| Base Composition (Substituted) | $v_{pa}$ | $\bar{\chi}_P$ | $\bar{r}_c$ | ΔH [kJ/mol$H_2$] | ΔH [J/molK] | $P_{eq}$(25° C.), bar $H_2$ | $P_{eq}$(125° C.), bar $H_2$ |
|---|---|---|---|---|---|---|---|
| AB alloy | | | | | | | |
| TiFe | 13.71 | 1.68 | 146.0 | 29.7 | 105 | 1.9 | 7.9 |
| $(Ti_{0.95}Mo_{0.05})Fe$ | 13.66 | 1.72 | 145.7 | 24.5 | 99 | 39 | 95 |
| $AB_2$ alloy | | | | | | | |
| $ZrFe_2$ | 14.88 | 1.66 | 146.3 | 29.8 | 108 | 2.7 | 55 |
| $(Zr_{0.9}V_{0.05}Mo_{0.05})(Fe_{1.8}Cr_{0.2})$ | 14.62 | 1.67 | 146.1 | 23.0 | 98 | 13 | 134 |
| $AB_2$ alloy | | | | | | | |
| $TiCr_2$ | 13.02 | 1.62 | 146.0 | 25.3 | 122 | 83 | 1080 |
| $(Ti_{0.8}Mo_{0.2})(Cr_{1.8}Mn_{0.2})$ | 12.91 | 1.65 | 145.6 | 19.6 | 110 | 205 | 1498 |
| HEA | | | | | | | |
| TiZrCrMnFeNi | 13.77 | 1.64 | 144.8 | 25.7 | 101.6 | 6.4 | 86.5 |
| $Ti(Zr_{0.5}V_{0.5})CrMnFeNi$ | 12.92 | 1.66 | 143.0 | 13.2 | 88.4 | 201 | 768 |
| $(TiVZr)(Co_{1.5}Mn_{1.5}Fe_{1.5}Ni_{1.5})$ | 12.58 | 1.73 | 138.6 | 14.1 | 95 | 316 | 1322 |

Features have been described herein in accordance with at least the following examples.

(A1) In an aspect, a method for creating a hydrogen compressor includes identifying a final composition for a storage media of the hydrogen compressor. Identifying the final composition for the storage media includes: a) providing a proposed composition for the storage media as input to a computer-implemented machine learning model, where the proposed composition comprises a first element and a second element, and further where the proposed composition has a known plateau pressure associated therewith; b) providing a target plateau pressure for the storage media as input to the computer-implemented machine learning model; and c) identifying, by the computer-implemented machine learning model, the final composition for the storage media, where the final composition for the storage media is different from the proposed composition for the storage media, where the final composition has a computed plateau pressure that is closer to the target plateau pressure than the known plateau pressure. The final composition for the storage media includes: 1) at least one of the first element or the second element; and 2) a third element. The computer-implemented machine learning model identifies the final composition based upon properties of the first element, the second element, and the third element, where the properties comprise the ground state volume per atom of the elemental solid, the covalent radius, the Pauling electronegativity, and the number of valence electrons. The method for creating the hydrogen compressor also includes forming the storage media for the hydrogen compressor such that the storage media is at least partially formed of the final composition.

(A2) In some embodiments of the method of (A1), the computed plateau pressure of the final composition is greater than the known plateau pressure of the proposed composition.

(A3) In some embodiments of the method of at least one of (A1)-(A2), the average ground state volume per atom of the updated composition is less than the average ground state volume per atom of the proposed composition.

(A4) In some embodiments of the method of at least one of (A1)-(A3), the average number of valence electrons of elements of the updated composition is less than the average number of valence electrons of the proposed composition.

(A5) In some embodiments of the method of at least one of (A1)-(A4), the average Pauling negativity of elements of the updated composition is greater than the average Pauling negativity of the elements of the initial composition.

(A6) In some embodiments of the method of at least one of (A1)-(A5), a hydrogen desorption enthalpy of the updated composition is less than the hydrogen desorption enthalpy of the proposed composition.

(A7) In some embodiments of at least one of the methods of (A1)-(A6), the method also comprises including the storage media in a first stage of the hydrogen compressor. The method additionally includes coupling a second stage to the first stage in the hydrogen compressor, where the second stage comprises a second storage media, the second storage media formed of a third composition that differs from the proposed composition and the final composition.

(B1) In another aspect, a method for using a hydrogen storage system includes receiving a request for hydrogen from the hydrogen storage system, where the hydrogen storage system includes a storage media that is formed of a composition, where the composition of the storage media is identified by way of a process that includes several acts. The acts include: a) providing a proposed composition for the storage media as input to a computer-implemented machine learning model, where the proposed composition comprises a first element and a second element, and further where the proposed composition has a known plateau pressure associated therewith; b) providing a target plateau pressure for the storage media as input to the computer-implemented machine learning model; and c) identifying, by the computer-implemented machine learning model, the composition for the storage media, where the composition for the storage media is different from the proposed composition for the storage media, and further where the composition has a computed plateau pressure that is closer to the target plateau pressure than the known plateau pressure. The composition for the storage media includes: 1) at least one of the first element or the second element; and 2) a third element. The computer-implemented machine learning model identifies the composition based upon properties of the first element, the second element, and the third element. The properties include the ground state volume per atom of the elemental solid, the covalent radius, the Pauling electronegativity, and the number of valence electrons. The method for using the hydrogen storage system also includes releasing the hydrogen from the hydrogen storage system in response to receipt of the request.

(B2) In some embodiments of the method of (B1), the computed plateau pressure of the composition is greater than the known plateau pressure of the proposed composition.

(B3) In some embodiments of the method of at least one of (B1)-(B2), the average ground state volume per atom of the composition is less than the average ground state volume per atom of the proposed composition.

(B4) In some embodiments of the method of at least one of (B1)-(B3), the average covalent radius of elements of the composition is less than the average covalent radius of elements of the proposed composition.

(C1) In yet another aspect, a hydrogen compressor includes an inlet valve, an outlet valve, a storage container in fluid communication with the inlet valve and the outlet value, and a heat transfer device. The hydrogen compressor also includes storage media arranged inside the storage container, where the storage media is formed from a composition, and further where the composition is selected by way of a process that includes at least some acts of a method disclosed herein (e.g., at least some acts of any of the methods of (A1)-(A7) or (B1)-(B4)).

While various inventive aspects, concepts and features of the disclosures may be described and illustrated herein as embodied in combination in the embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures-such as alternative materials, structures, configurations, methods, devices, and components, alternatives as to form, fit, and function, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein.

Additionally, even though some features, concepts, or aspects of the disclosures may be described herein as being a preferred arrangement or method, such description is not intended to suggest that such feature is required or necessary unless expressly so stated. Still further, representative values and ranges may be included to assist in understanding the present application, however, such values and ranges are not to be construed in a limiting sense and are intended to be critical values or ranges only if so expressly stated.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term “includes” is used in either the detailed description or the claims, such term is intended to be inclusive in a manner similar to the term “comprising” as “comprising” is interpreted when employed as a transitional word in a claim.

What is claimed is:

1. A hydrogen compressor comprising:
an inlet valve;
an outlet valve;
a storage container in fluid communication with the inlet valve and the outlet valve;
a heat transfer device; and
storage media arranged inside the storage container, wherein the storage media is formed from a composition, wherein the composition is selected and made by way of a process comprising:
providing a proposed composition for the storage media as input to a computer-implemented machine learning model, wherein the proposed composition comprises a first element and a second element, and further wherein the proposed composition has a known plateau pressure associated therewith;

providing a target plateau pressure for the storage media as input to the computer-implemented machine learning model; and identifying, by the computer-implemented machine learning model, the composition for the storage media, wherein the composition for the storage media is different from the proposed composition for the storage media, wherein the composition has a computed plateau pressure that is closer to the target plateau pressure than the known plateau pressure, and further wherein the composition for the storage media comprises:

at least one of the first element or the second element; and a third element;

wherein the computer-implemented machine learning model identifies the composition based upon properties of the first element, the second element, and the third element, and further wherein the properties comprise a ground state volume per atom of an elemental solid, a covalent radius, a Pauling electronegativity, and a number of valence electrons.

2. The hydrogen compressor of claim 1, wherein the computed plateau pressure of the composition is greater than the known plateau pressure of the proposed composition.

3. The hydrogen compressor of claim 2, wherein an average ground state volume per atom of the composition is less than an average ground state volume per atom of the proposed composition.

4. The hydrogen compressor of claim 2, wherein an average covalent radius of elements of the composition is less than an average covalent radius of elements of the proposed composition; and/or wherein an average number of valence electrons of elements of the composition is less than an average number of valence electrons of the proposed composition.

5. The hydrogen compressor of claim 2, wherein an average Pauling negativity of elements of the composition is greater than an average Pauling negativity of the elements of the proposed composition; and/or wherein a hydrogen desorption enthalpy of the composition is less than a hydrogen desorption enthalpy of the proposed composition.

6. The hydrogen compressor of claim 1, wherein the first element is a hydride forming element and the second element is a non-hydride forming element.

7. The hydrogen compressor of claim 1, wherein at least the first element and second element are independently selected from the group consisting of: Ti, Fe, Zr, Cr, Mn, Ni, V, Co, and combinations thereof.

8. The hydrogen compressor of claim 1, further comprising:

a first stage comprising the storage media; and a second stage comprising a second storage media, the second storage media formed of a third composition that differs from the proposed composition and the composition;

wherein the third composition produces an output plateau pressure that differs from the proposed composition and the composition.

9. A method for creating a hydrogen compressor, the method comprising:

identifying a final composition for a storage media of the hydrogen compressor, wherein identifying the final composition for the storage media comprises:

providing a proposed composition for the storage media as input to a computer-implemented machine learning model, wherein the proposed composition comprises a first element and a second element, and further wherein the proposed composition has a known plateau pressure associated therewith;

providing a target plateau pressure for the storage media as input to the computer-implemented machine learning model; and identifying, by the computer-implemented machine learning model, the final composition for the storage media, wherein the final composition for the storage media is different from the proposed composition for the storage media, wherein the final composition has a computed plateau pressure that is closer to the target plateau pressure than the known plateau pressure, and further wherein the final composition for the storage media comprises:

at least one of the first element or the second element; and a third element;

wherein the computer-implemented machine learning model identifies the final composition based upon properties of the first element, the second element, and the third element, and further wherein the properties comprise a ground state volume per atom of an elemental solid, a covalent radius, a Pauling electronegativity, and a number of valence electrons; and forming the storage media for the hydrogen compressor such that the storage media is at least partially formed of the final composition.

10. The method of claim 9, wherein the computed plateau pressure of the final composition is greater than the known plateau pressure of the proposed composition.

11. The method of claim 10, wherein an average ground state volume per atom of the final composition is less than an average ground state volume per atom of the proposed composition.

12. The method of claim 10, wherein an average covalent radius of elements of the final composition is less than an average covalent radius of elements of the proposed composition; and/or wherein an average number of valence electrons of elements of the final composition is less than an average number of valence electrons of the proposed composition.

13. The method of claim 10, wherein the final composition forms an interstitial metal hydride when loaded with hydrogen.

14. The method of claim 10, wherein an average Pauling negativity of elements of the final composition is greater than an average Pauling negativity of the elements of the initial composition.

15. The method of claim 9, wherein a hydrogen desorption enthalpy of the final composition is less than a hydrogen desorption enthalpy of the proposed composition.

16. The method of claim 9, further comprising:

including the storage media in a first stage of the hydrogen compressor; and coupling a second stage to the first stage in the hydrogen compressor, wherein the second stage comprises a second storage media, the second storage media formed of a third composition that differs from the proposed composition and the final composition;

wherein the third composition produces an output plateau pressure that differs from the proposed composition and the composition.

17. A method for using a hydrogen storage system, the method comprising:

receiving a request at a controller for hydrogen to be released from the hydrogen storage system, wherein the hydrogen storage system comprises a storage media that is formed of a composition, wherein the composition of the storage media is made by way of a process comprising:

providing a proposed composition for the storage media as input to a computer-implemented machine learning model, wherein the proposed composition comprises a first element and a second element, and further wherein the proposed composition has a known plateau pressure associated therewith;

providing a target plateau pressure for the storage media as input to the computer-implemented machine learning model; and identifying, by the computer-implemented machine learning model, the composition for the storage media, wherein the composition for the storage media is different from the proposed composition for the storage media, wherein the composition has a computed plateau pressure that is closer to the target plateau pressure than the known plateau pressure, and further wherein the composition for the storage media comprises:

at least one of the first element or the second element; and a third element;

wherein the computer-implemented machine learning model identifies the composition based upon properties of the first element, the second element, and the third element, and further wherein the properties comprise a ground state volume per atom of the elemental solid, a covalent radius, a Pauling electronegativity, and a number of valence electrons; and releasing the hydrogen from the hydrogen storage system in response to receipt of the request.

18. The method of claim 17, wherein the computed plateau pressure of the composition is greater than the known plateau pressure of the proposed composition and a desired filling pressure hydrogen storage system is about 350 bar to about 850 bar.

19. The method of claim 18, wherein an average ground state volume per atom of the composition is less than an average ground state volume per atom of the proposed composition and an average covalent radius of elements of the composition is less than an average covalent radius of elements of the proposed composition.

20. The method of claim 18, wherein the composition of the storage media forms an interstitial metal hydride when loaded with hydrogen and wherein the first, second, and third element is independently selected from the group consisting of: Ti, Fe, Zr, Cr, Mn, Ni, V, Co, and combinations thereof.

* * * * *